US011456615B2

(12) United States Patent
Song et al.

(10) Patent No.: US 11,456,615 B2
(45) Date of Patent: Sep. 27, 2022

(54) BATTERY BACKUP SYSTEM REDUNDANCY

(71) Applicant: Intel Corporation, Santa Clara, CA (US)

(72) Inventors: Chuan Song, Shanghai (CN); Xiaoguo Liang, Shanghai (CN); Feng Jiang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 412 days.

(21) Appl. No.: 16/369,845

(22) Filed: Mar. 29, 2019

(65) Prior Publication Data
US 2020/0313456 A1 Oct. 1, 2020

(51) Int. Cl.
G06F 1/30 (2006.01)
H02J 9/06 (2006.01)
H02J 7/02 (2016.01)
H02J 7/00 (2006.01)

(52) U.S. Cl.
CPC ............... *H02J 9/061* (2013.01); *G06F 1/30* (2013.01); *H02J 7/0013* (2013.01); *H02J 7/02* (2013.01)

(58) Field of Classification Search
CPC .................................... G06F 1/26; G06F 1/32
See application file for complete search history.

(56) References Cited

U.S. PATENT DOCUMENTS

| 7,500,120 | B2* | 3/2009 | Egan | H02J 9/061 |
| | | | | 713/300 |
| 10,432,017 | B1* | 10/2019 | Morales | H02J 9/061 |
| 10,725,514 | B1* | 7/2020 | Wang | G06F 1/263 |
| 2005/0055587 | A1* | 3/2005 | Lee | G06F 1/28 |
| | | | | 713/300 |
| 2006/0125443 | A1* | 6/2006 | Bolduc | H02J 7/1423 |
| | | | | 320/104 |
| 2012/0134090 | A1* | 5/2012 | Peng | G06F 1/189 |
| | | | | 361/679.31 |
| 2013/0232370 | A1* | 9/2013 | Kawamoto | H04N 1/00885 |
| | | | | 713/340 |
| 2015/0115711 | A1* | 4/2015 | Kouroussis | G06F 1/3206 |
| | | | | 307/23 |
| 2015/0303726 | A1* | 10/2015 | Lei | H01M 16/00 |
| | | | | 307/9.1 |
| 2016/0181861 | A1* | 6/2016 | Familiant | H02J 9/062 |
| | | | | 307/66 |

(Continued)

*Primary Examiner* — Phil K Nguyen
(74) *Attorney, Agent, or Firm* — Schwabe, Williamson & Wyatt, P.C.

(57) ABSTRACT

Techniques and mechanisms for providing redundancy with multiple batteries of a backup power system. In an embodiment, switch circuits are each coupled between a power bus and a different respective one of the multiple batteries. Respective nodes of the switch circuits are each to couple to a different respective power sink, wherein power delivery to the power sinks is monitored. Based on the monitoring, the switch circuits are configured for a first battery to serve a substitute for a second battery. Configuring the switch circuits includes electrically decoupling the second battery from a first node, and electrically coupling the first battery to deliver power via both a power bus and the first node. In another embodiment, multiple backup units each include a respective battery and switch circuit, wherein respective controllers of the backup units intermittently communicate monitoring information via a data bus.

20 Claims, 10 Drawing Sheets

(56) References Cited

U.S. PATENT DOCUMENTS

| | | | |
|---|---|---|---|
| 2019/0074712 A1* | 3/2019 | Liang | H02J 7/00714 |
| 2019/0235599 A1* | 8/2019 | Yuasa | G06F 1/30 |
| 2020/0183725 A1* | 6/2020 | Grehan | G06F 9/45558 |

* cited by examiner

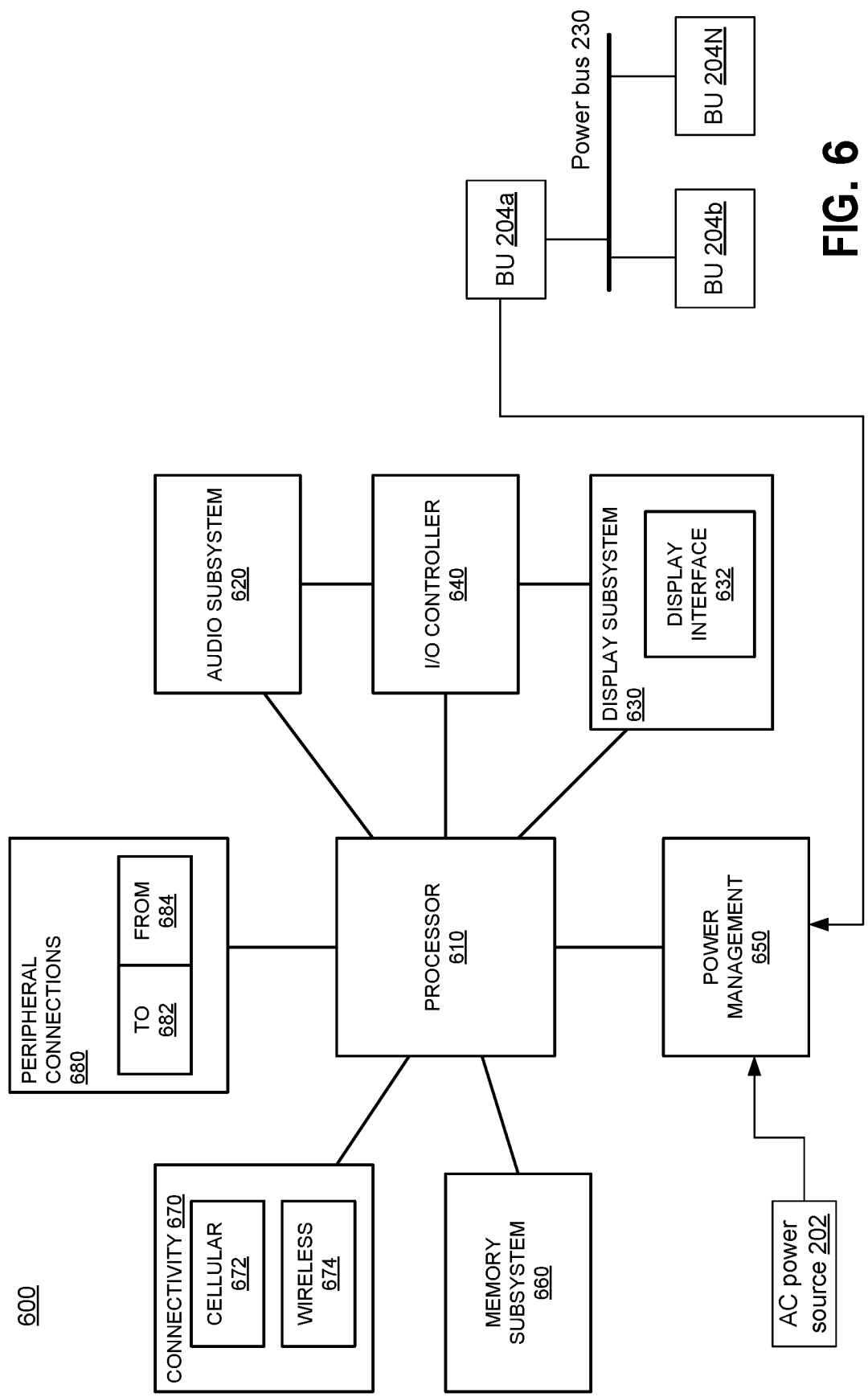

BATTERY BACKUP SYSTEM REDUNDANCY

BACKGROUND

1. Technical Field

Embodiment described herein relate generally to backup power delivery and more particularly, but not exclusively, to mechanisms for providing redundancy with multiple backup batteries.

2. Background Art

Data centers are one example of a use case where a high priority is placed on the reliable delivery of power among multiple servers, racks and/or other power sink devices. In such use cases, backup systems typically facilitate at least temporary delivery of battery power when a primary power supply is interrupted. As server farms and other such network resources continue to proliferate in number, size, and capability, there is expected to be an increasing demand for always-on operation of such resources.

BRIEF DESCRIPTION OF THE DRAWINGS

The various embodiments of the present invention are illustrated by way of example, and not by way of limitation, in the figures of the accompanying drawings and in which:

FIG. 6 illustrates a computer system, a computing device or a SoC (System-on-Chip), where the computing device receives Direct Current (DC) power from a battery backup system that has built-in redundancy, according to some embodiments.

DETAILED DESCRIPTION

Figure 1:
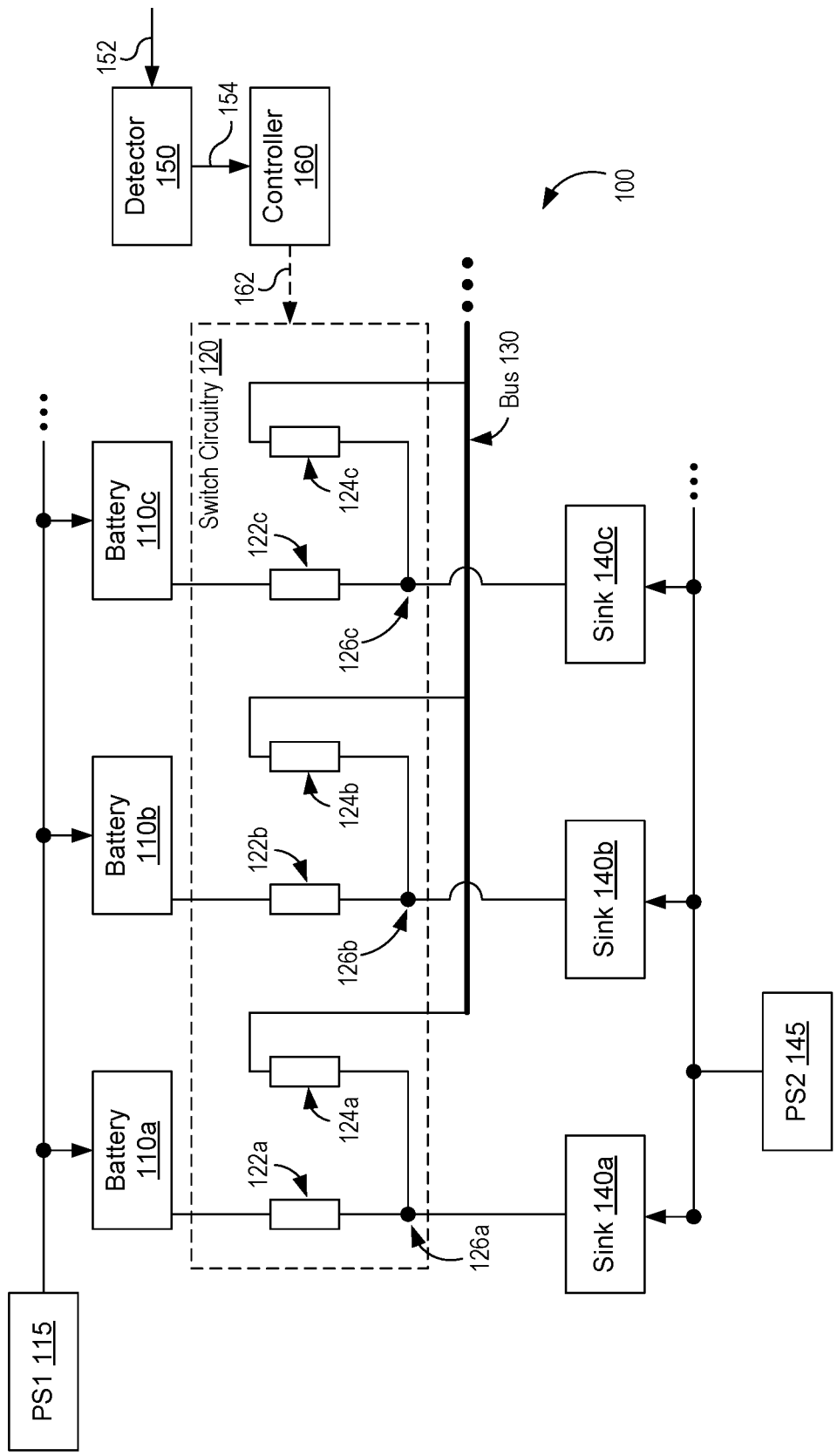
FIG. 1 schematically illustrates a battery backup system which supports backup redundancy according to some embodiments.

Embodiments described herein variously provide redundancy between batteries which are to provide backup power for multiple power sinks. In some embodiments, a device comprises multiple batteries, which (for example) supply DC power in case of an AC power failure. For example, a first battery is coupled to supply power to a first one or more devices, a second battery is coupled to supply power to a second one or more devices, a third battery is coupled to supply power to a third one or more devices, and so on. The first one or more devices may be, merely as an example, first one or more servers installed in a first server rack of a data center; the second one or more devices may be, merely as an example, second one or more servers installed in a second server rack of the data center, and so on, although the teachings of this disclosure are not limited by such examples.

In some embodiments, backup units (BUs) of such a device each include a respective one of the batteries—e.g., wherein control circuitry of the BUs communicate, for example, over a communication bus. For example, a given BU broadcasts information regarding its operational state over the communication bus. A BU may periodically (or intermittently) broadcast that it is operating as intended. In an example, a lack of such a broadcast may indicate that the BU has failed. In another example, the broadcast may provide indication of a failed state of the BU. Thus, the BUs in the BU cluster are aware of any BU within the cluster that is not operating as intended.

Furthermore, the BUs are coupled to a power bus through corresponding switches. Normally, when the AC power is out and the BUs of the cluster are operating as intended, the power bus is not powered. In such a situation, the first BU supplies power to the first one or more devices, the second BU supplies power to the second one or more devices, and the third BU supplies power to the third one or more devices.

However, there may arise a situation when the AC power has failed and one of the BUs (e.g., the first BU) of the cluster is also out of service. In such a situation, the second BU continues supplying power to the second one or more devices, and the third BU continues supplying power to the third one or more devices. Additionally, one or both the second or the third BU (or one or more other BUs of the cluster) supply power to the power bus. The first one or more devices now receives power from the power bus. Thus, addition of the power bus enables redundancy to the BU cluster, where in case of a BU failure, other operational BU(s) can take over the operation of the failed BU. The system is readily scalable, as any number of BUs can be coupled to the power bus. Other technical effects will be evident from the various embodiments and figures.

Certain features of various embodiments are described herein with reference to circuit structures being electrically coupled to (or electrically decoupled from) one other based on a configuration of switch circuitry. In this context, "electrically coupled" refers herein to the characteristic of a conductive path being provided between circuit structures based on the configuration of such switch circuitry. Electrical coupling of circuit structures is provided, for example, with an on (e.g., closed circuit) state of a switch—e.g., where an off (e.g., open circuit) state of such a switch electrically decouples said circuit structures. Electrical coupling is to be distinguished, for example, from coupling—e.g., mere physical coupling—which, in and of itself, may not provide such a conductive path (at least under some conditions).

Furthermore, certain features of various embodiments are described herein with reference to switch circuitry being configured based on an indication that power delivery is deficient (or alternatively, sufficient), according to some predetermined performance criteria. In various embodiments, such criteria includes (for example) a threshold current level, a threshold current stability, a threshold voltage level, a threshold voltage stability, a threshold level of battery charge, an threshold stability of battery charge, and/or any of various other performance characteristics related to a delivery of power. Such performance criteria is provided, for example, by a manufacturer, engineer, system administrator or other authority—e.g., based on device testing, system modeling, customer specifications and/or the like. The particular value(s) of such performance criteria are typically subject implementation-specific details and may be determined, for example, using operations adapted from conventional techniques for defining power delivery constraints. Some embodiments are not limited to a particular type, value, source and/or means of determination of such performance criteria.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

FIG. 1 schematically illustrates a device 100 for providing redundancy among multiple backup batteries, according to some embodiments. Device 100 comprises multiple batteries (e.g., including the illustrative batteries 110a, 110b, 110c shown) which, for example, include at least three batteries. Elements referred to herein with a common reference label followed by a particular number or alphabet may be collectively referred to by the reference label alone. For example, batteries 110a, 110b, 110c may be collectively and generally referred to as batteries 110 in plural, and battery 110 in singular.

A battery 110 provides battery back-up to one or more power sink devices which are to couple to (or, in some embodiments, are part of) device 100. For example, device 100 comprises power sink 140a, power sink 140b, power sink 140c, and so on. Any one of power sinks 140 represents a single device, or a collection of devices. Individual sinks 140 may represent any appropriate computing devices that may receive Alternating Current (AC) power (e.g., from a power source PS2 145) and/or Direct Current (DC) power from a battery 110. Merely as an example, device 100 is implemented in a data center comprising servers or computing devices—e.g., where an individual sink 140 represents a server rack which comprises multiple servers. The teachings of this disclosure are not limited by a type and/or a number of sinks 140.

In some embodiments, device 100 comprises a bus (referred to herein as a "power bus"), such as the illustrative bus 130 shown, which—in combination with switch circuitry 120 of device 100—is available to variously deliver power between a given one of batteries 110 and a given one of sinks 140. As will be discussed in further details herein, power bus 130 may supply DC power to one or more of sinks 140, e.g., when PS2 145 supplying AC power to the one or more sinks 140 fails and/or when one or more of batteries 110 is non-working.

In some embodiments, batteries 110 are coupled, directly or indirectly, to receive power from a power source PS1 115, where batteries 110 are made available to provide DC voltage to sinks 140. For example, in some embodiments, some or all of batteries 110 are coupled to PS1 115 via charging circuitry (not shown) which facilitates battery (re)charging using power from PS1 115. PS1 115 and PS2 145 are different AC power sources, for example, or in some embodiments, the same AC power source.

In the example embodiment shown, switching circuitry 120 comprises a first switch circuit (including, for example, the illustrative switches 122a, 124a shown) which is coupled between bus 130 and battery 110a. Selective operation of switch 122a enables battery 110a to be electrically coupled to, or electrically decoupled from, a node 126a between switches 122a, 124a. Selective operation of switch 124a enables node 126a to be electrically coupled to, or electrically decoupled from, bus 130. In some embodiments, switch circuitry 120 further comprises respective circuits to selectively provide electrical coupling of batteries 110b, 110c to sinks 140b, 140c (respectively). By way of illustration and not limitation, a second circuit of switch circuitry 120 (the second circuit comprising switches 122b, 124b) is coupled between battery 110b and power bus 130. Alternatively or in addition, a third circuit of switch circuitry 120 (the third circuit comprising switches 122c, 124c) is coupled between battery 110c and power bus 130. In one such embodiment, a node 126b between switches 122b, 124b is to be coupled to sink 140b—e.g., wherein a node 126c between switches 122c, 124c is to be coupled to sink 140c. Switches 122b, 122c each correspond functionally to switch 122a, in some embodiments—e.g., wherein switches 124b, 124c each correspond functionally to switch 124a, and where nodes 126b, 126c each correspond functionally to node 126a.

In an embodiment, device 100 comprises logic (e.g., including hardware and/or executing software) which provides functionality to monitor one or more characteristics of power delivery by device 100 and, based on such monitoring, to selectively configure a particular state of switch circuitry 120. By way of illustration and not limitation, the logic may selectively configure one of multiple possible states of switch circuitry 120—e.g., including a "battery backup" state wherein batteries 110a, 110b, 110c are electrically coupled to sinks 140a, 140b, 140c, respectively. Such a battery backup state is configured, for example, in response to an indication that power delivery by PS2 145 to sinks 140 is (or is expected to be) deficient, according to some predetermined performance criteria.

In one such embodiment, the multiple possible states further comprise a "backup redundancy" state wherein one of batteries 110 is electrically coupled to one of sinks 140 via bus 130—e.g., while another of batteries 110 is electrically decoupled from sinks 140. Such a backup redundancy state is configured, for example, in response to an indication that—according to the same or some other predetermined performance criteria—power delivery by that particular one of batteries 110 is (or is expected to be) deficient—e.g., during the above-described deficiency of power delivery by PS2 145 to sinks 140.

Additionally or alternatively, such multiple possible states further comprise, in some embodiments, a "disabled backup" state wherein each of batteries 110 is electrically decoupled from sinks 140. Such a disabled backup state is configured, for example, in response to an indication that power delivery by PS2 145 to sinks 140 is (or is expected to be) sufficient to meet a corresponding predetermined performance criteria.

In the example embodiment shown, device 100 comprises detector circuitry (such as the illustrative detector 150 shown) which is coupled to monitor one or more characteristics of actual or potential power delivery to sinks 140. For example, detector 150 is coupled to receive one or more signals 152 which describe or otherwise indicate one or more parameters of power delivery performance and/or capability—e.g., where performance monitoring by detector 150 includes one or more operations adapted from conventional power monitoring techniques.

During operation of device 100, detector 150 may determine, based on the one or more signals 152 and one or more performance criteria, that some power delivery—e.g., with PS2 145 and/or with one of batteries 110—is (or is expected to be) deficient in one or more respects. This determination is indicated with a signal 154 communicated by detector 150 to a controller 160 of device 100.

In one example scenario, signal 154 indicates a deficiency of power delivery with a first one of batteries 110. Based on this indication by signal 154, controller 160 selects a second one of batteries 110, and (with a control signal 162) configures backup redundancy state of switch circuitry 120, wherein the second one of batteries 110 is to function as an alternative to—that is, a substitute for—the first one of batteries 110. In one illustrative embodiment, in response to signal 154 indicating a deficiency of power delivery with battery 110a, controller 160 selects another of batteries 110 to serve as an alternative to battery 110a—e.g., where battery 110*b* is selected over battery 110*c*. Based on this selection, controller 160 provides a control signal 162 to transition switch circuitry 120 from a first state to a second state. The first state is, for example, a battery backup state which (by respective on states of switches 122*a*, 122*b*, 122*c*) electrically couples batteries 110*a*, 110*b*, 110*c* to nodes 126*a*, 126*b*, 126*c*, respectively, while bus 130 is electrically decoupled (by respective off states of switches 124*a*, 124*b*, 124*c*) from each of nodes 126*a*, 126*b* and 126*c*. The second state is a backup redundancy state which, in this example, electrically couples battery 110*b* (by respective on states of switches 124*b*, 124*a*) to node 126*a* via node 126*b* and bus 130, while battery 110*a* is electrically decoupled (by an off state of switch 122*a*) from node 126*a*. In one such embodiment, signal 154 subsequently indicates that power delivery with battery 110*a* is again sufficient to satisfy performance criteria. In response to such an indication by signal 154, controller 160 transitions switch circuitry 120 from the second state back to the first state.

In some embodiments, controller 160 is operable to transition switch circuitry 120 from one backup redundancy state to another backup redundancy state. For example, while switch circuitry 120 is in the above-described second state, signal 154 may indicate to controller 160 a deficiency of power delivery with battery 110*b* (which is currently being provided as the alternative to battery 110*a*). Based on such indicating by signal 154, controller 160 performs a selection of battery 110*c* (for example) as an alternative to battery 110*b*. Based on such selection, control signal 162 is communicated to transition switch circuitry 120 from the second state to a third state—i.e., a different backup redundancy state—wherein battery 110*c* is electrically coupled to node 126*a* via node 126*c* and bus 130, while battery 110*a* is electrically decoupled from node 126*a*. During the third state, battery 110*b* is electrically decoupled from bus 130 and/or sink 140*b*, in some embodiments.

In some embodiments, controller 160 additionally or alternatively operates to transition switch circuitry 120 between a disabled backup state and a battery backup state. For example, control signal 162 may configure a battery backup state where signal 154 indicates a deficiency of power delivery by PS2 145 to sinks 140. Additionally or alternatively, control signal 162 may configure a disabled backup state where signal 154 indicates that power delivery by PS2 145 to sinks 140 is sufficient to satisfy some predetermined performance criteria.

Some embodiments, such as device 100, comprise resources—referred to herein as "backup units" (or "BUs")—which each comprise a respective battery and a respective switch circuit. For example, a given BU in various embodiments comprises one of batteries 110 and one of the first switch circuit, second switch circuit, or third switch circuit of switch circuitry 120. In one such embodiment, a data bus is coupled to such multiple BUs. For example, functionality such as that of controller 160 is distributed (in some embodiments) among respective control circuits of said BUs, where the control circuits variously communicate performance monitoring information via the data bus.

Figure 2A:
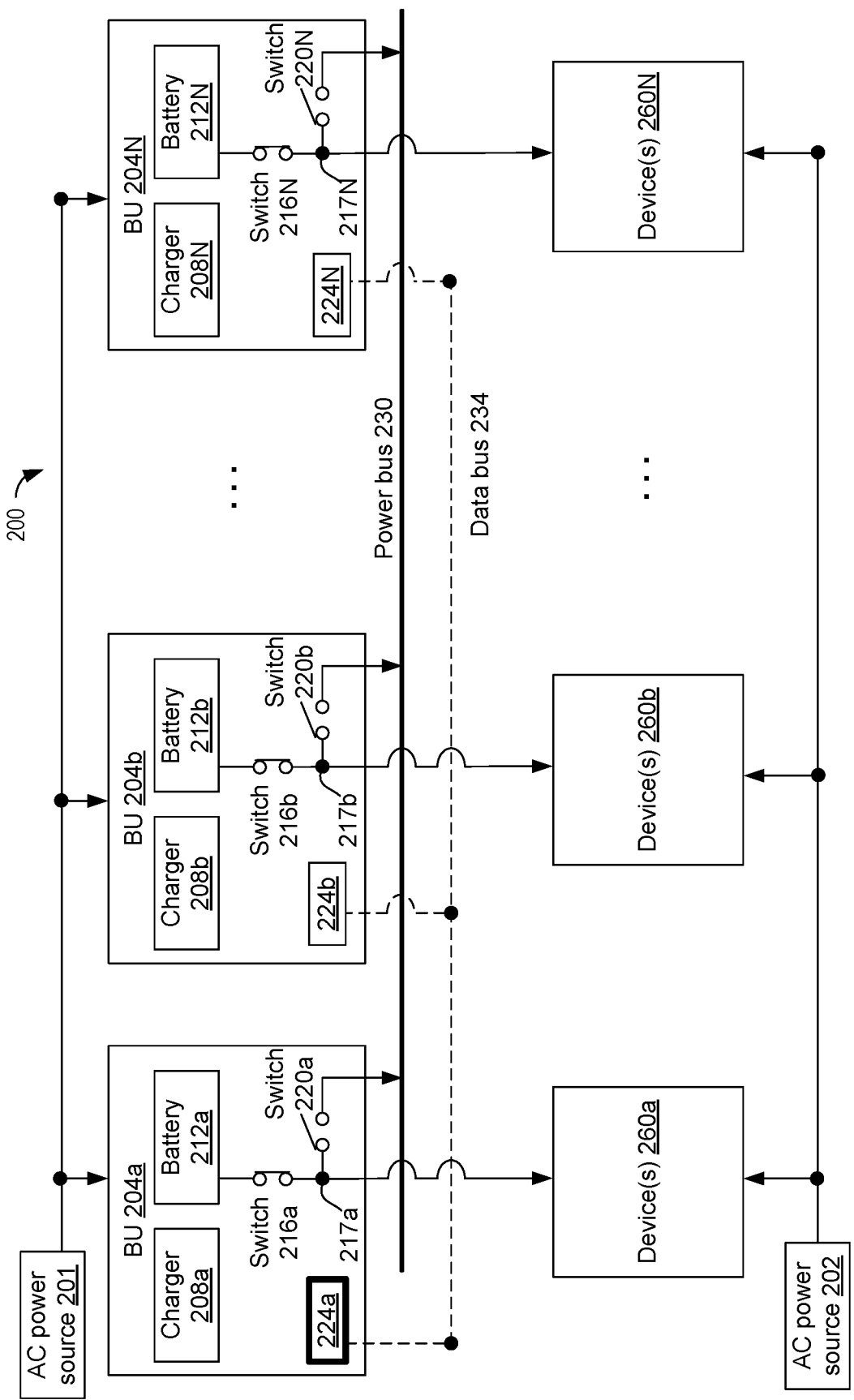
FIG. 2A schematically illustrates a system for providing battery backup redundancy according to some embodiments.

For example, FIG. 2A schematically illustrates a system 200 for providing redundancy to backup units (BUs) 204*a*, 204*b*, . . . , 204N, according to some embodiments. In the example embodiment shown, BU 204*a* comprises a battery 212*a*, switches 216*a*, 220*a*, and a node 217*a* coupled therebetween. Similarly, BU 204*b* comprises a battery 212*b*, switches 216*b*, 220*b*, and a node 217*b* coupled therebetween—e.g., where BU 204N comprises a battery 212N, switches 216N, 220N, and a node 217N coupled therebetween. BUs 204*a*, 204*b*, . . . 204N further comprise respective controllers 224*a*, 224*b*, . . . 224N which are variously coupled to communicate via a data bus 234.

A power bus 230 is coupled to switches 220, and devices 260*a*, 260*b*, . . . , 260N are coupled to BUs 204 via nodes 217*a*, 217*b*, . . . , 217N, respectively. BUs 204 are variously coupled each to receive power from an AC power source 201—e.g., where devices 260 are variously coupled each to receive power from another AC power source 202. AC power source 201 and AC power source 201 are different power sources, for example, or in some embodiments, the same power source.

System 200 provides various functionality of device 100, in some embodiments—e.g., wherein batteries 212 correspond functionally to batteries 110, switches 216 correspond functionally to switches 122, switches 220 correspond functionally to switches 124, and nodes 217 correspond functionally to nodes 126. Controllers 224 operate together to provide functionality such as that of controller 160 (and, in some embodiments, detector 150). In one such embodiment, devices 260 correspond functionally to sinks 140—e.g., wherein AC power source 201 and AC power source 202 correspond functionally to PS1 115 and PS2 145 (respectively).

In an embodiment, a BU 204 provides battery back-up to one or more devices of the system 200. For example, the system 200 comprises first one or more device(s) 260*a*, second one or more device(s) 260*b*, Nth one or more device(s) 260N, and so on. Thus, device(s) 260*a* may represent a single device, or a collection of devices. Individual devices 260 may represent any appropriate computing devices that may receive Alternating Current (AC) power (e.g., from an AC power source 202) and/or Direct Current (DC) power from a BU 204. Merely as an example, the system 200 may be implemented in a data center comprising servers or computing devices, and an individual device 260 may represent a server rack comprises multiple servers.

In some embodiments, the system 200 comprises a power bus 230 to supply DC power to one or more of the devices 260, e.g., when the AC power source 202 supplying AC power to the one or more devices 260 fails and/or when one or more of the BUs 204 is non-working.

In some embodiments, the BUs 204 receive AC power from an AC power source 201, and provides DC voltage to the devices 260. A BU 204, for example, the BU 204*a*, comprises a charger circuit 208*a* (also referred to as charger 208) and a battery 212*a*. The battery 212*a* comprises one or more batteries, which may be charged by the charger 208*a* using the AC power from the AC power source 201.

In some embodiments, the BU 204*a* comprises a switching element (also referred to as switch) 216*a*. In some embodiments, the battery 212*a* is selectively coupled to the devices 260*a* via the switch 216*a*. For example, when the switch 216*a* is on or closed, the devices 260*a* receives DC power from the battery 212*a*. In FIG. 2A, the switch 216*a* is illustrated to be in a closed or on position. The switch 216*a* may comprise relays, transistors, and/or any appropriate type of switch(es). The switch 216*a* may be controlled by firmware of the BU 204, by a controller 224*a* of the BU 204*a*, and/or the like.

In some embodiments, the BU 204*a* further comprises a switching element (also referred to as switch) 220*a* coupled to the switch 216*a*. A node between the switches 216*a* and 220*a* is referred to as node 217*a*. In an example, the node 217*a* is coupled to the devices 260*a*, and the node 217*a* supplies power to the devices 260a. The node 217a is also coupled to the power bus 230 via the switch 220a. Thus, when the switch 220a is closed, the node 217a may receive DC power from, or supply DC power to, the power bus 230. In FIG. 2A, the switch 220a is illustrated to be in an open or off position. The switch 220a may comprise relays, transistors, and/or any appropriate type of switch(es). The switch 220a may be controlled by firmware of the BU 204, by the controller 224a of the BU 204a, and/or the like.

In an example, when the switches 216a and 220a are both on, then the battery 212a may supply power to the devices 260a and the power bus 230. In an example, when the switch 216a is off and the switch 220a is on, then the battery 212a is electrically decoupled from the power bus 230 and the devices 260a, and the devices 260a may receive DC power from the power bus 230 via the switch 220a. When the switches 216a and 220a are both off, then the devices 260a do not receive any DC power from the BU cluster comprising the BUs 204a, . . . , 204N.

In some embodiments, the BU 204a further comprises a controller 224a, which may also be referred to as a Battery Management System (BMS) 224a. The controller 224a may control switching of the switches 216a, 220a, and/or may control one or more operations of the BU 204a (e.g., may control the charging of the battery 212a by the charger 208a).

Although the structure of the BU 204a is discussed herein above in details, the BU 204b, . . . , 204N may at least in part have similar structure. For example, the BU 204b may include charger 208b, battery 212b, switches 216b, 220b, node 217b, and controller 224b; the BU 204N may include charger 208N, battery 212N, switches 216N, 220N, node 217N, and controller 224N; and so on.

In some embodiments, the system 200 may further include a data bus 234 (illustrated using a dotted line to, for example, better differentiate from lines transmitting AC or DC power). The data bus 234 (also referred to as a communication bus, power management bus, a BU management bus, and/or the like) may be any appropriate serial communication bus for communication among the controllers 224a, 224b, . . . , 224N, etc. Merely as an example and without limiting the scope of this disclosure, the data bus 234 may be implemented in accordance with RS-485 technical standard (also known as TIA-485(-A), EIA-485 standard), e.g., which was approved in March, 1998, reaffirmed in March, 2003, or any versions thereof.

The controllers 224a, . . . , 224N may communicate, among themselves, various information about their corresponding BU 204a, . . . , 204N. Merely as an example, a controller 224a may share with other controllers (e.g., controllers 224b, . . . , 224N) whether the BU 204a is working as expected, is overloaded, is non-operational, or the like. Thus, for example, the controller 224a may broadcast, over the data bus 234 (e.g., which may be received by other controllers, e.g., controllers 224b, . . . , 224N), a state of the BU 204a (e.g., where the state refers to whether the BU 204a is operational, overloaded, low-charge level of the battery 212a, non-operational, etc.). In an example, such information associated with the state of the BU 204a may be referred to as "heart-beat" or "state information" of the BU 204a.

Such broadcast of state information over the data bus 234 may be performed in a periodic, aperiodic, or intermittent basis. Merely as an example, the controller 224a may broadcast the state information of the BU 204a every 1 second, or the like. In another example, the controller 224a may broadcast the state information of the BU 204a every "T" time interval, where T may range from about 0.5 milli-seconds to about 5 seconds, or the like.

The broadcast of state information may be done sequentially (or in another order). Merely as an example, the controller 224a may broadcast the state information of the BU 204a, then the controller 224b may broadcast the state information of the BU 204b, and so on, and finally the controller 224N may broadcast the state information of the BU 204N, and this sequence may be repeated. In another example, a controller 224 may broadcast the state information of the corresponding BU 204, when such state information is available to the controller 224.

Thus, in the system 200, the data bus 234 connects the BUs 204, e.g., to a form a cluster of BUs. The data bus 234 builds the distributed cluster, e.g., to organize and manage the BUs 204 in the cluster.

In the system 200 of FIG. 2A, the controllers 224 may be set up in a master-slave configuration. For example, one of the controllers 224 (e.g., controller 224a) may act as a master controller, and other controllers (e.g., controllers 224b, . . . , 224N) may act as slave controllers. In this example, the master controller 224a may control one or more aspects of the operations of the controllers 224a, 224b, . . . , 224N. The master controller 224a may collect the state information broadcast by various controllers 224, and may control one or more aspects of the operations of the controllers 224a, 224b, . . . , 224N based on the received state information of various BUs 204. To illustrate that the controller 224a may act as a master controller, in the example of FIG. 2A, the controller 224a is depicted using a bold-lined box. Merely as an example, if the BU 204a fails or becomes at least partly non-operational, another controller 224 (e.g., controller 224b) may take over the role of the master controller.

In another example, there is no single master controller, where two or more controllers 224 may, in unison or in a distributed manner, control one or more aspects of the operations of the slave controllers.

Figure 2B:
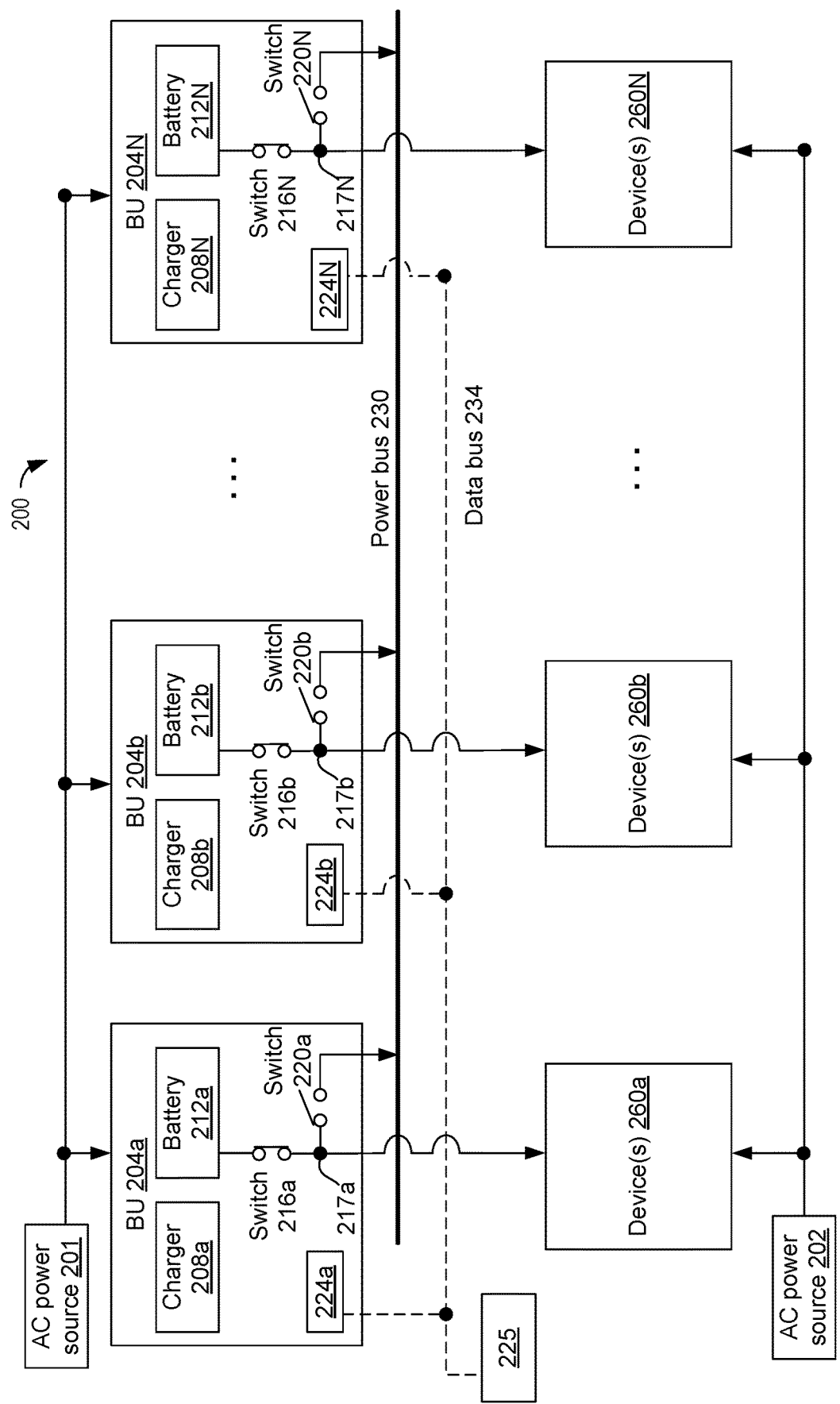
FIG. 2B schematically illustrates a system for providing battery backup redundancy, where a controller (that is external to backup units) acts as a master controller, according to some embodiments.

In yet another example, a controller that is external to the BUs 204 may act as a master controller. For example, FIG. 2B schematically illustrates the system 200 for providing redundancy to Battery Backup Systems (BUs) 204a, 204b, . . . , 204N, where an external controller 225 acts as a master controller, according to some embodiments. FIG. 2B is similar to FIG. 2A, except for the presence of the external controller 225 (e.g., which is external to the BUs 204). The master controller 225 may collect the state information broadcast by various controllers 224, and may control one or more aspects of the operations of the controllers 224a, 224b, . . . , 224N based on the received state information.

The teachings of this disclosure are not limited by a selection of the master controller. For example, as discussed with respect to FIG. 2A, the controller 224a may act as the master controller; and as discussed with respect to FIG. 2B, the controller 225 may act as the master controller. In order to not obfuscate the teachings of this disclosure, it is assumed henceforth that, unless otherwise specifically mentioned, the controller 224a acts as the master controller, although such assumption does not limit the teachings of this disclosure. In an example, a single master controller may be replaced by a distributed control system comprising two or more of the controllers 224.

Referring again to FIG. 2A, the devices 260 may also receive AC power from the AC power source 202 (e.g., where the power sources 202 and 201 may be the same, or may be different). In some embodiments, the devices 260 may, during normal operating conditions such as when AC power from the AC power source 202 is available, operate using the AC power from the AC power source 202. However, when the AC power from the AC power source 202 is unavailable or is inadequate to power the devices 260, the devices 260 may use the DC power from the BUs 204 for operation.

Figure 3A:
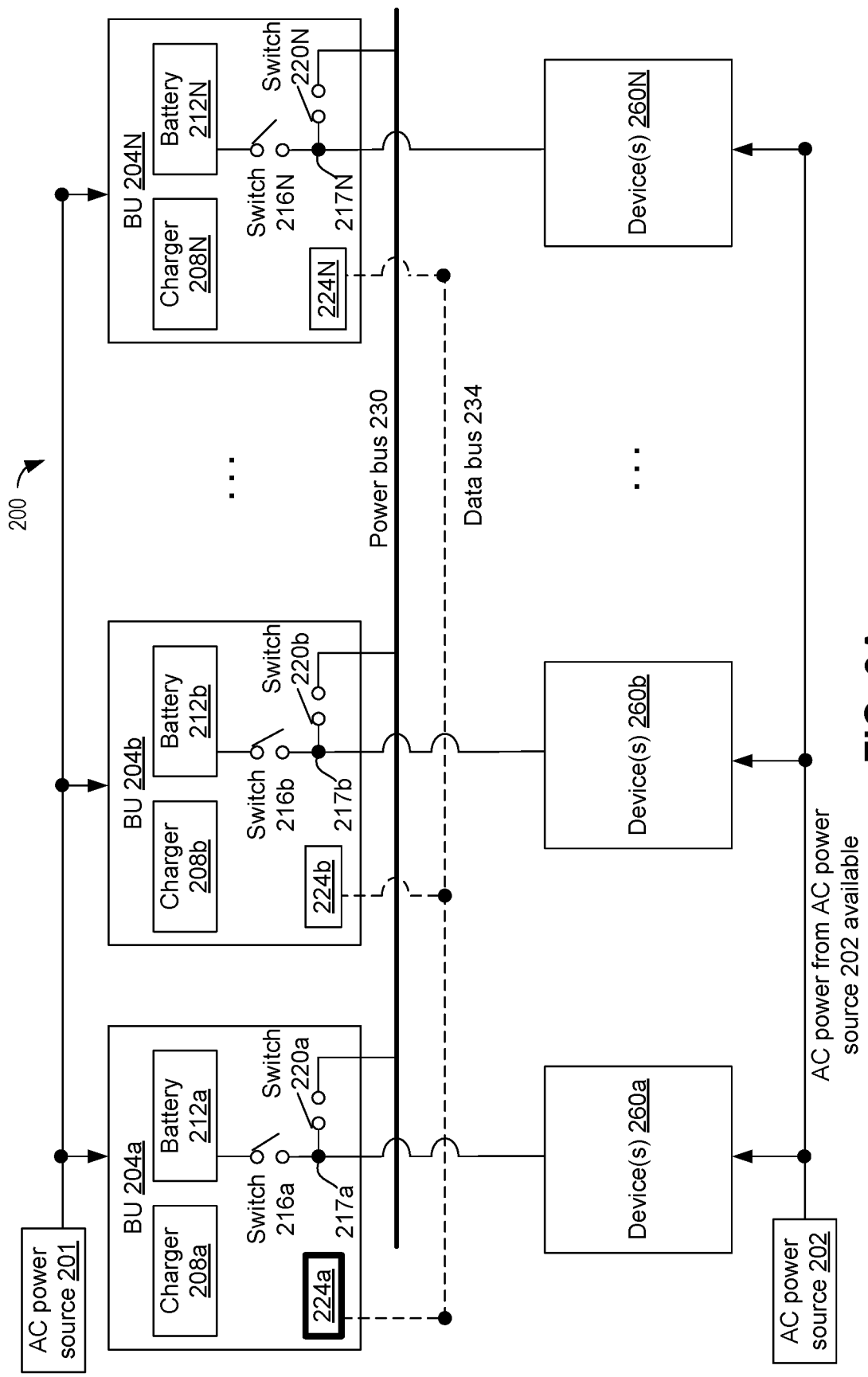
FIGS. 3A-3D illustrate various aspects of operation of the system of FIGS. 2A-2B, according to some embodiments.

FIGS. 3A-3D illustrate various aspects of operation of the system 200 of FIG. 2A, according to some embodiments. Referring to FIG. 3A, illustrated is a scenario where AC power from the AC power source 202 is available (and satisfies some predetermined criteria), and the devices 260 operate based on the AC power. The devices 260 do not use DC power from the BUs 204, and hence, switches 216a, ..., 216N are open or off. The BUs 204 receive power from the AC power source 201, and the chargers 208 use this power to charge the batteries 212. The controllers 224a, 224b, ..., 224N intermittently (e.g., periodically or aperiodically) broadcast respective state information over the data bus 234.

Figure 3B:
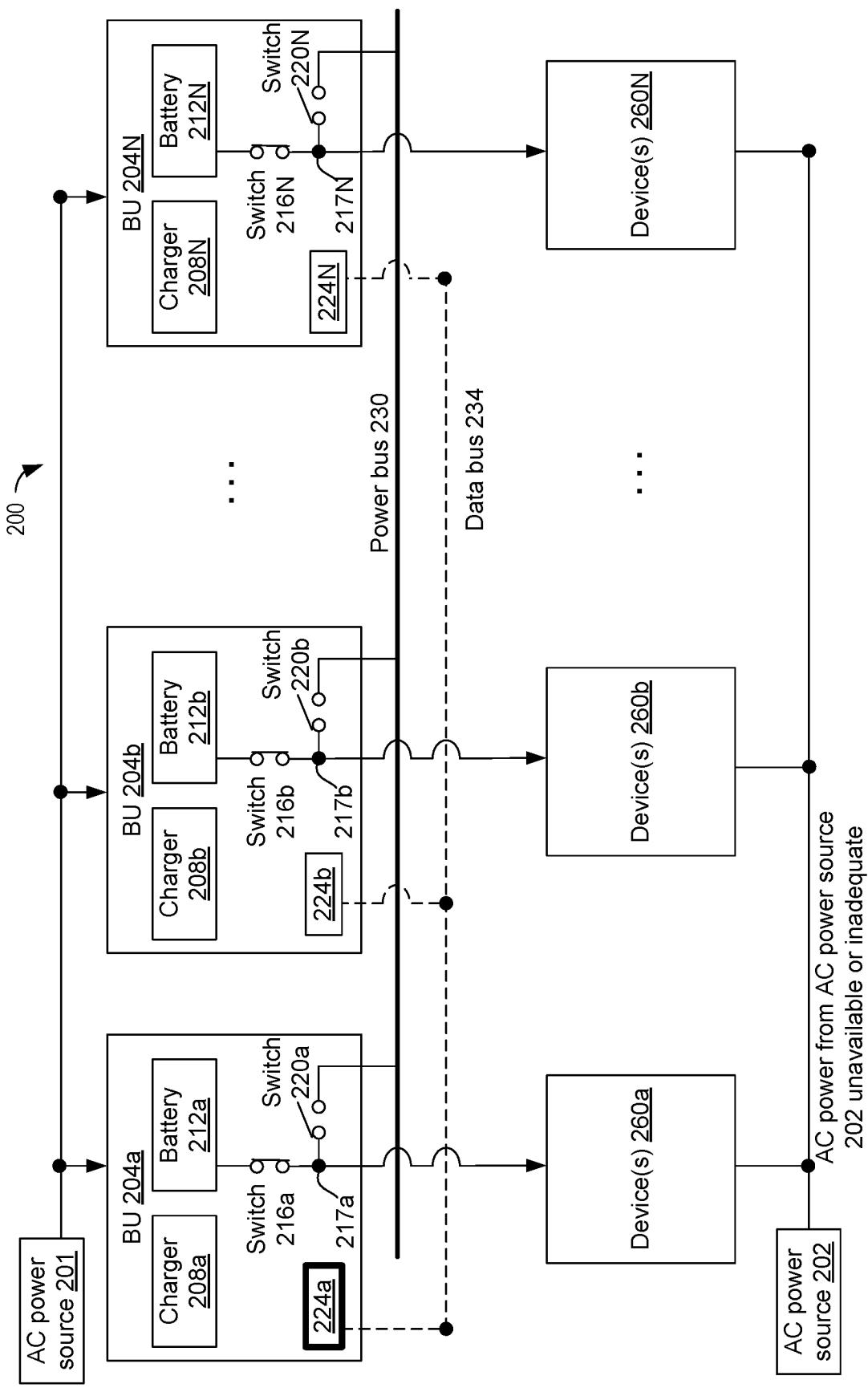

Referring now to FIG. 3B, illustrated is a scenario where AC power from the AC power source 202 is unavailable or inadequate. The controllers 224a, 224b, ..., 224N intermittently (e.g., periodically or aperiodically) broadcast respective state information over the data bus 234, and it is assumed that the BUs 204 are all functional or working as intended. The devices 260 switch to DC power received from the BUs 204. For example, switches 216a, 216b, ..., 216N are on or closed, and DC power from the batteries 212 of the BUs 204 are transmitted to their respective devices 260 via the respective nodes 217. For example, DC power from the battery 212a of the BU 204a is received by the devices 260a via the node 217a and the closed switch 216a; DC power from the battery 212b of the BU 204b is received by the devices 260b via the node 217b and the closed switch 216b, and so on. In FIG. 3B, the power bus is not powered by any of the BUs 204. The switches 220a, 220b, ..., 220N are off or open, and the power bus 230 is not powered by any of the BUs 204.

Figure 3C:
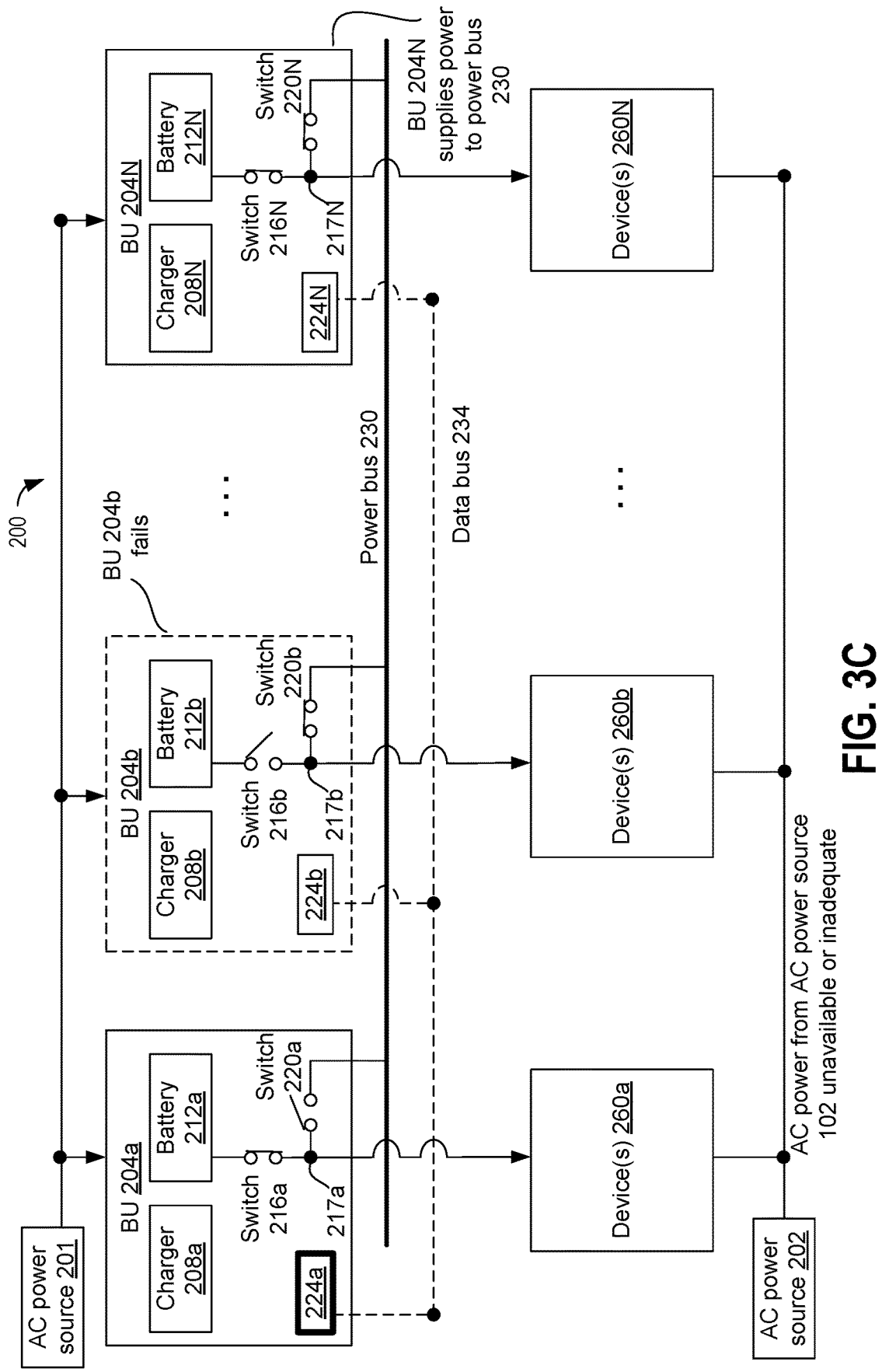

Referring now to FIG. 3C, illustrated is a scenario where AC power from the AC power source 202 is unavailable or inadequate, and at least one BU 204 has failed or at least in part non-operational. For example, in FIG. 3C, it is assumed that the BU 204b has failed or at least in part non-operational, e.g., is unable to meet the power demand of the devices 260b. This may happen when, for example, the charge of the battery 212b is depleted (e.g., below a threshold level), the BU 204b is out of service, and/or for any other reasons. The controllers 224a, 224b, ..., 224N intermittently (e.g., periodically or aperiodically) broadcast respective state information over the data bus 234. In an example, the controller 224b may broadcast that the BU 204b is non-operational. In another example, a lack of broadcast from the controller 224b may be indicative that the BU 204b is non-operational. Thus, the devices 260b cannot receive power from the BU 204b, and the AC power source 202 is also unable to meet the power demand of the devices 260b. The master controller 224a (or whichever controller acts as the master controller) determines (e.g., either from the broadcast of the controller 224b, or from lack of broadcast of the controller 224b) that the BU 204b is non-operational.

In the scenario discussed with respect to FIG. 3C, the power bus 230 is powered by one or more of the operational (or "healthy" or functional) BUs 204 (e.g., powered by one or more of the operational BUs 204a, 204c, ..., 204(N−1), 204N). For example, in the example of FIG. 3C, the BU 204N is assumed to supply DC power (e.g., from the battery 212N) to the power bus 230. For example, upon the master controller 224a (or a distributed control system comprising one or more of the controllers 224) determining that the BU 204b is non-operational, the master controller 224a instructs the controller 224N to switch on the switch 220N. As a result, the battery 212N of the BU 204N powers the devices 260N and the power bus 230.

Furthermore, in an example, upon the master controller 224a (or a distributed control system comprising one or more of the controllers 224) determining that the BU 204b is non-operational, the master controller 224a instructs the controller 224b to switch on the switch 220b and switch off the switch 216b. In another example, when the BU 204b is non-operational, the switch 220b is by default on (or closed) and the switch 216 is off (or open).

Thus, the devices 260b receives power from the BU 204N, e.g., via the power bus 230, the switch 220b, and the node 217b. The battery 212b is isolated from the power bus 230, e.g., as the switch 216 is off. Hence, the BU 204N is able to supply power to the devices 260b and 260N, in the event of failure of the BU 204b.

Other BUs supply power to their respective devices 260. For example, the battery 212a of the BU 204a supplies power to the devices 260a via the switch 216a, e.g., by bypassing the power bus 230. Similarly, the battery 212c of the BU 204c (not illustrated in the figures) supplies power to the devices 260c via the switch 216c, e.g., by bypassing the power bus 230, and so on.

Thus, in the system 200, the BUs 204a, ..., 204N form a cluster of BU. In the event of failure of one or more BUs and AC power outage occurring simultaneously, one or more other functional BUs can take over the load of the failed BU(s), e.g., by supplying power to the power bus 230. This adds redundancy to the system 200, increases reliability of the BU system, and decreases downtime of the devices 260 due to simultaneous AC power failure and BU failure.

Furthermore, the system 200 is easily scalable. For example, complexity of the system 200 does not grow with the number of BUs 204 in the BU cluster. Put differently, each BU 204 need not be physically connected to each of the devices 260. Rather, a single power bus 230 can connect any one or more BUs to any one or more devices 260, e.g., in the event of at least partial or complete failure of a BU, thereby making the system 200 highly scalable.

Figure 3D:
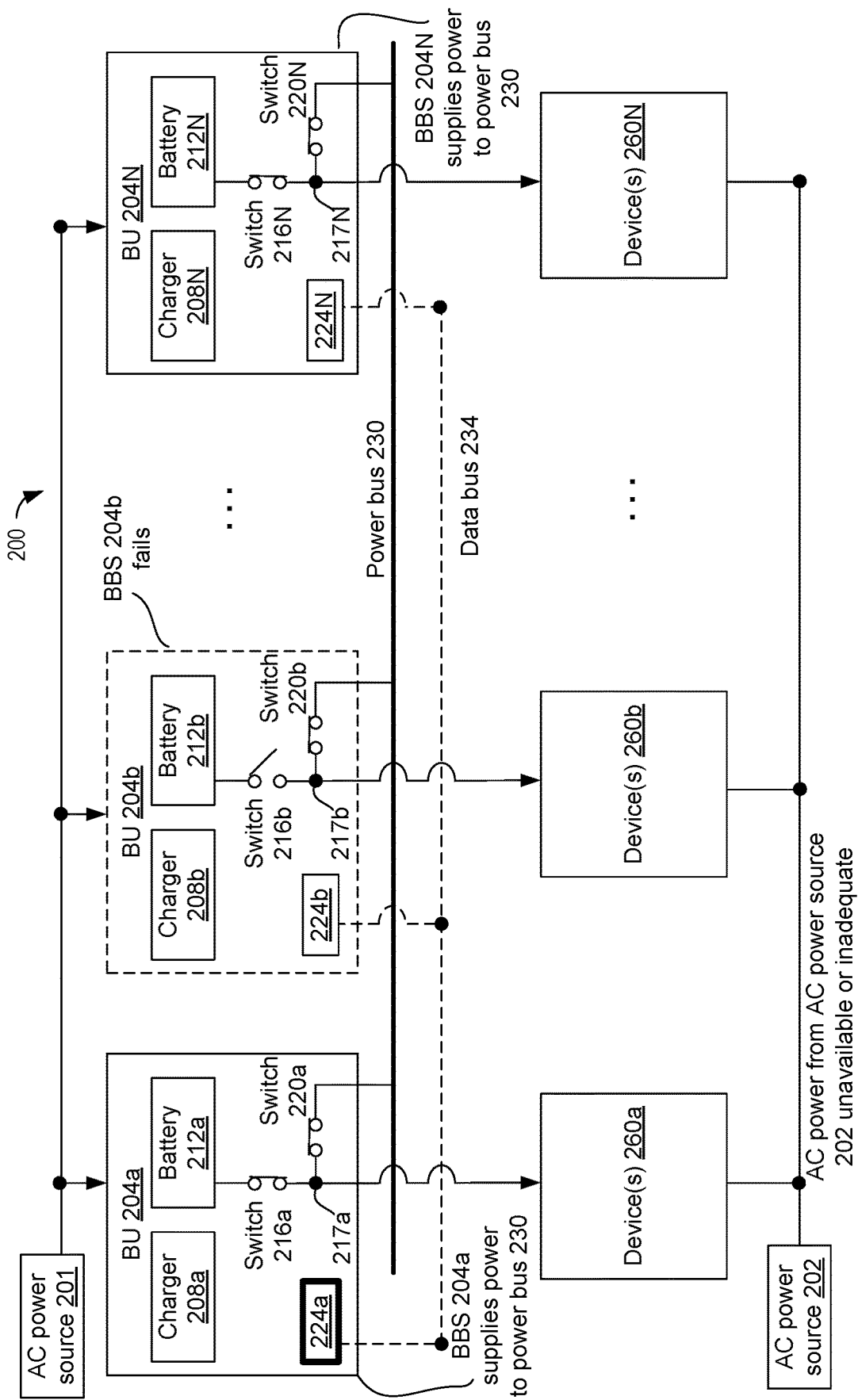

Referring now to FIG. 3D, illustrated is a scenario that is in part similar to FIG. 3C. For example, similar to FIG. 3C, in FIG. 3D it is assumed that AC power from the AC power source 202 is unavailable or inadequate, and at least one BU 204 (e.g., BU 204b) has failed or at least in part non-operational. However, unlike FIG. 3C where a single functional BU 204N was supplying power to the power bus 230, in the example of FIG. 3D two functional BUs 204a and 204N supply power to the power bus 230. Thus, the switches 220a and 220N are closed or on. The functional BU 204a supplies power to the power bus 230 and the devices 260a; and the functional BU 204N supplies power to the power bus 230 and the devices 260N. Similar to FIG. 3C, in FIG. 3D the devices 260b receive power from the power bus 230 via the switch 220b and the node 217b. Thus, unlike FIG. 3C (e.g., the load of the devices 260b is taken over by BU 204N), in FIG. 3D the load of the devices 260b is shared among the BUs 204a and 204N. Some embodiments provide for the configuration of more than two BUs to concurrently supply power to power bus 230 at a given time.

Figure 4:
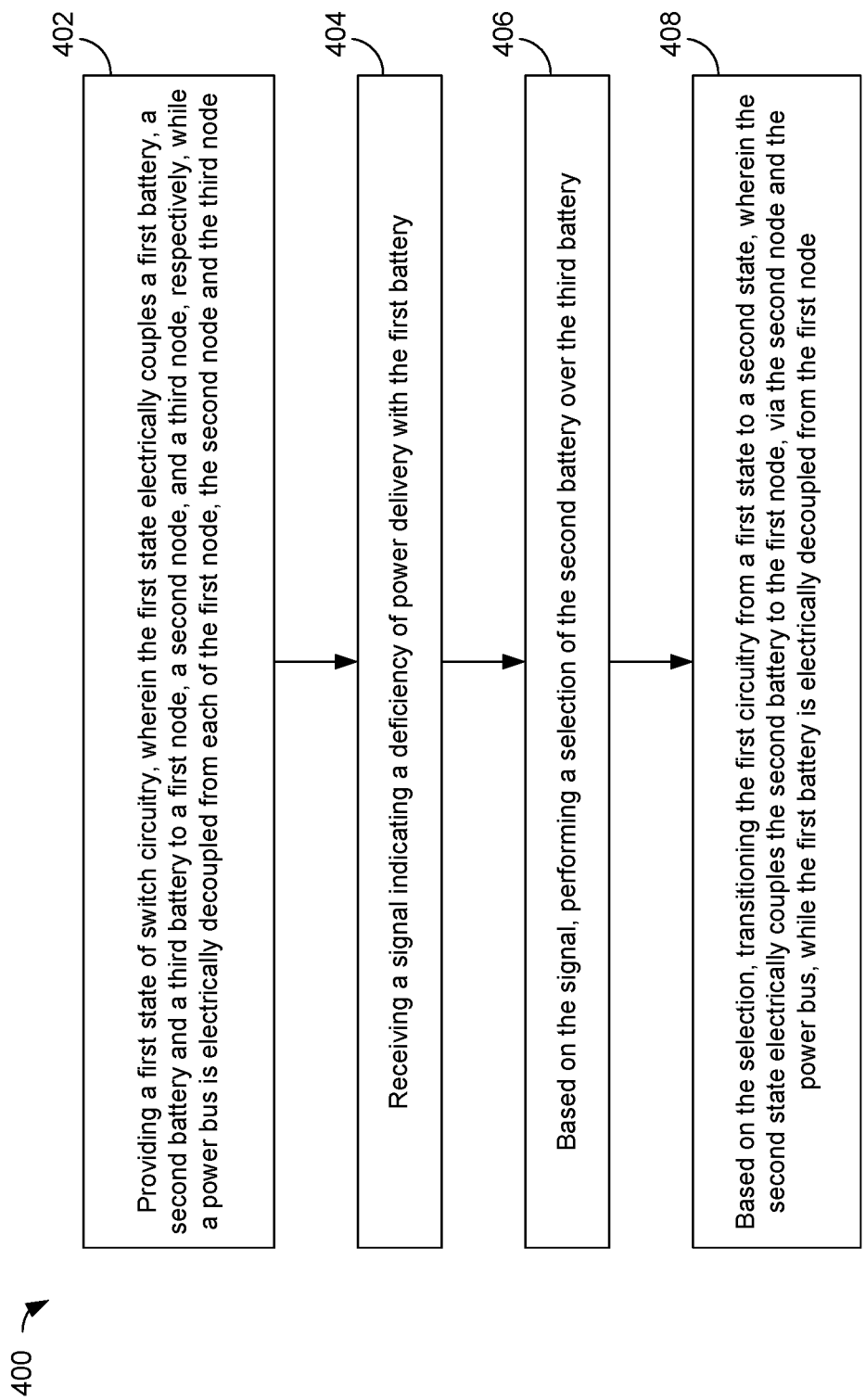
FIG. 4 illustrates a flowchart depicting a method for operating a battery backup cluster, e.g., comprising the backup units of the system of FIGS. 2A-2B, according to some embodiments.

FIG. 4 illustrates features of a method 400, according to an embodiment, to provide redundancy with backup batteries. Method 400 includes operation of circuitry such as that of device 100 or system 200, in some embodiments. In some embodiments, some or all of method 400 is performed with hardware and/or software logic which provides functionality of controller 160 (and, in some embodiment, functionality of detector 150).

As shown in FIG. 4, method 400 comprises, at 402, providing a first state of switch circuitry (e.g., switch circuitry 120), wherein the first state electrically couples a first battery, a second battery and a third battery to a first node, a second node, and a third node, respectively, while a power bus is electrically decoupled from each of the first node, the second node and the third node. In one example embodiment, the first battery, second battery and third battery are (respectively) batteries 110a, 110b, 110c—e.g., wherein the first node, second node, and third node are nodes 126a, 126b, 126c, respectively. The power bus is, for example, bus 130 or power bus 230.

In an embodiment, the switch circuitry comprises switch circuits each coupled between the power bus and a different respective battery of multiple batteries comprising the first battery, the second battery, and the third battery. For example, a first switch circuit comprises switches 122a, 124a—e.g., wherein a second switch circuit comprises switches 122b, 124b, and/or a third switch circuit comprises switches 122c, 124c. The first node, second node and third node are each coupled to a different respective one of a first power sink, a second power sink and a third power sink (e.g., sinks 140a, 140b, 140c, respectively), in some embodiments.

Method 400 further comprises, at 404, receiving a signal indicating a deficiency of power delivery with the first battery. For example, the receiving at 404 (in some embodiments) comprises controller 160 receiving signal 154. Based on the signal received at 404, method 400 (at 406) performs selects the second battery, over the third battery, to operate as a substitute for the first battery. In an embodiment, the selection at 406 is based on a comparison of respective performance characteristics of a plurality of batteries other than the first battery. In one example scenario, the second battery is selected over the third battery based at least in part on a relatively low level of charge (as compared to the second battery) which the third battery currently has.

Method 400 further comprises, at 408, based on the selection, transitioning the switch circuitry from a first state to a second state, wherein the second state electrically couples the second battery to the first node, via the second node and the power bus, while the first battery is electrically decoupled from the first node. In some embodiments, the second state further electrically couples the third battery to the third power sink via the third node. Alternatively or in addition, the second state further electrically couples the third battery to the first node, via the third node and the power bus.

In some embodiments, backup units of the device each comprise a different respective one of the multiple batteries, a different respective one of the multiple switch circuits, and a respective controller circuit, wherein a data bus is coupled to each of the backup units, wherein the data bus communicates the signal. In one such embodiment, method 400 further comprises, for each of the backup units, the respective controller circuit of the backup unit intermittently broadcasting on the data bus information describing operation by the battery of the backup unit. Alternatively or in addition, method 400 further comprises, for each of the backup units, charging the respective battery of the backup unit with a power source which is coupled to each of the backup units.

In some embodiments, method 400 further comprises additional operations (not shown) which provide one or more other states of the switch circuitry—e.g., where the additional operations transition the switch circuitry to a battery backup state, another backup redundancy state, or a disabled backup state as variously described herein.

In one example embodiment, such additional operations comprise detecting another signal which indicates a sufficiency of power delivery with the first battery. Based on this other signal, method 400 transitions the switch circuitry from the second state back to the first state.

In another example embodiment, method 400 further comprises performing a second selection of the third battery over the second battery, where the second selection is based on a signal which indicates a deficiency of power delivery with the second battery. Based on the second selection, method 400 transitions the switch circuitry from the second state to a third state (i.e., a different backup redundancy state), wherein the third state electrically couples the third battery to the first node via the third node and the power bus, while the first battery is electrically decoupled from the first node. In one such embodiment, the third state further electrically decouples the second battery from the power bus.

In still another embodiment, method further comprises detecting a deficiency of power delivery by an alternating current (AC) source—e.g., by PS2 145—to the first power sink, the second power sink, and the third power sink. Based on such detecting, method 400 transitions the switch circuitry from a third state (e.g., a disabled backup state) to one of the first state or the second state, wherein the third state electrically decouples the first node, the second node, and the third node each from the power bus and from the multiple batteries. In one such embodiment, method 400 further comprises detecting a sufficiency of power delivery by the AC source to the first power sink, the second power sink, and the third power sink—e.g., where, based on the third signal, the switch circuitry is transitioned from one of the first state or the second state back to the third state.

Figure 5:
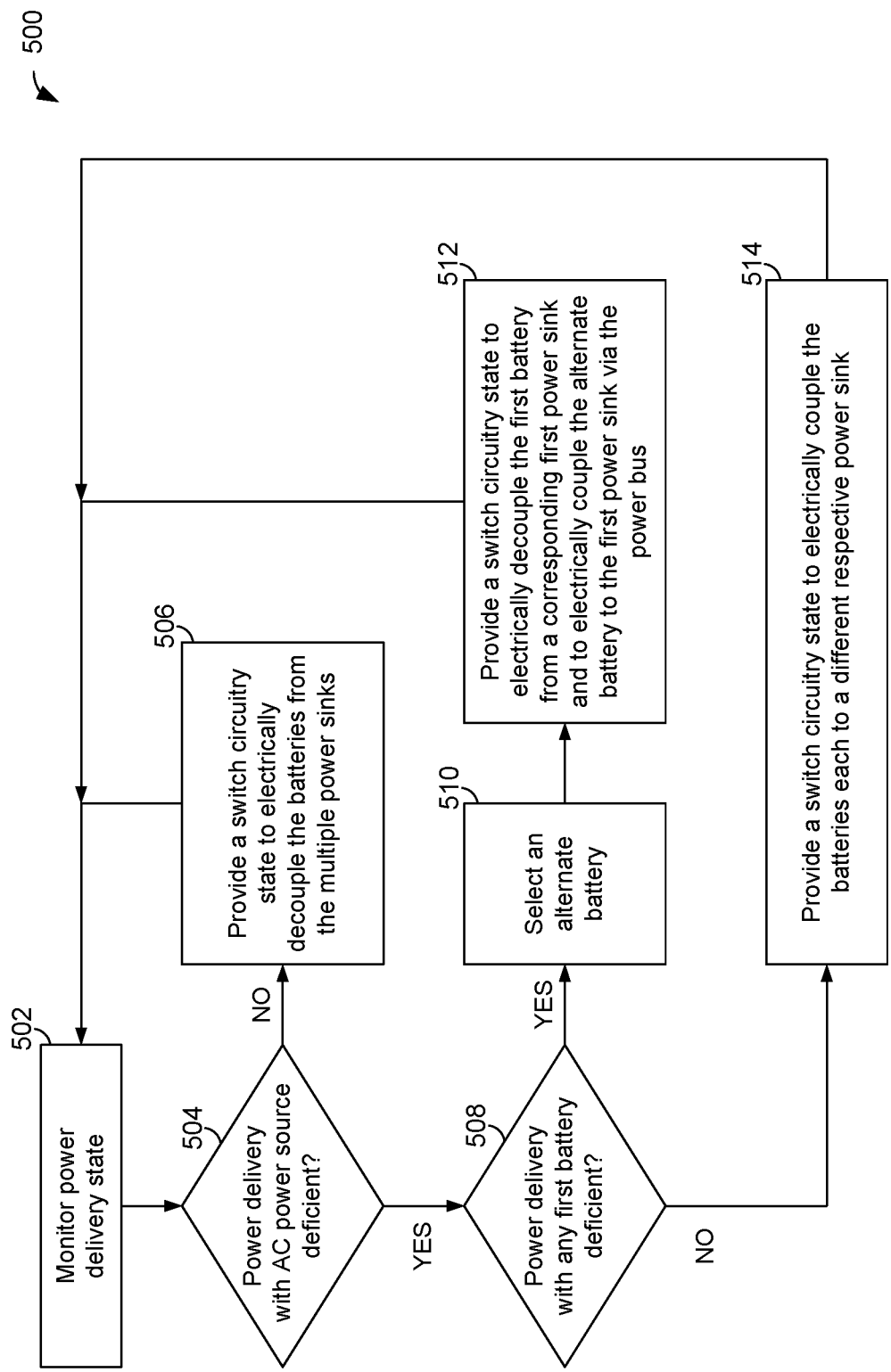
FIG. 5 illustrates a flowchart depicting a method for operating a battery backup cluster, e.g., comprising the backup units of the system of FIGS. 2A-2B, where a selection of backup units for supplying power to devices associated with a failed backup unit changes dynamically, according to some embodiments.

FIG. 5 illustrates features of a method 500, according to an embodiment, to provide redundancy with backup batteries. Method 500 includes operation of circuitry such as that of device 100 or system 200, in some embodiments. In some embodiments, some or all of method 500 is performed with hardware and/or software logic which provides functionality of controller 160 (and, in some embodiment, functionality of detector 150). Method 500 comprises some or all of method 400, in some embodiments.

As shown in FIG. 5, method 500 comprises, at 502, monitor power delivery state—e.g., where such monitoring is provided with, or otherwise based on, operations of detector 150. Based on such monitoring, one or more evaluations are made—e.g., periodically or otherwise on a repeated basis—to determine whether switch circuitry is to be configured based on a deficiency (or, alternatively, a sufficiency) of power delivery characteristics.

In the example embodiment shown, such one or more evaluations comprise determining, at 504, whether power delivery with an AC power source to multiple power sinks (e.g., including sinks 140a, 140b, 140c coupled to PS2 145) is deficient. The one or more evaluations further comprise determining, at 508, whether power delivery with any first battery of multiple batteries (e.g., including batteries 110) is deficient. Some embodiments are not limited to a particular order or timing of determinations such as those at 504 and 508.

Where is it determined at 504 that the power delivery with the AC power source is not deficient, method 500 provides (at 506) a switch circuitry state—i.e., a disabled backup state—to electrically decouple the multiple batteries from the multiple power sinks. After configuring the disabled backup state at 506, method 500 returns to monitoring power delivery state at 502.

Where is it determined at 508 that power delivery with some first battery of multiple batteries is deficient, method 500 select an alternate battery (at 510), and provides another switch circuitry state (at 512) to provide the selected alternate battery as a substitute for the first battery. During this switch circuitry state i.e., a backup redundancy state the first battery is electrically decoupled from a corresponding first power sink, and the alternate battery is electrically coupled to the first power sink via a power bus (e.g., bus 130). After configuring the backup redundancy state at 512, method 500 returns to monitoring power delivery state at 502.

Where is it instead determined at 508 that power delivery with each of the multiple batteries is sufficient (while power delivery by the AC power source is deficient), method 500 provides (at 514) a switch circuitry state—i.e., a battery backup state—wherein the multiple batteries are electrically coupled each to a different respective power sink. After configuring the battery backup state at 514, method 500 returns to monitoring power delivery state at 502.

FIG. 6 illustrates a computer system, a computing device or a SoC (System-on-Chip) 600, where the computing device receives DC power from a BU system that has built-in redundancy (e.g., as discussed with respect to FIGS. 1-5), according to some embodiments. It is pointed out that those elements of FIG. 6 having the same reference numbers (or names) as the elements of any other figure can operate or function in any manner similar to that described, but are not limited to such.

In some embodiments, computing device 600 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 600.

In some embodiments, computing device 600 includes a first processor 610. The various embodiments of the present disclosure may also comprise a network interface within 670 such as a wireless interface so that a system embodiment may be incorporated into a wireless device, for example, cell phone or personal digital assistant.

In one embodiment, processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O with a human user or with other devices, operations related to power management, and/or operations related to connecting the computing device 600 to another device. The processing operations may also include operations related to audio I/O and/or display I/O.

In one embodiment, computing device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 600, or connected to the computing device 600. In one embodiment, a user interacts with the computing device 600 by providing audio commands that are received and processed by processor 610.

Display subsystem 630 represents hardware (e.g., display devices) and software (e.g., drivers) components that provide a visual and/or tactile display for a user to interact with the computing device 600. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touch screen (or touch pad) device that provides both output and input to a user.

I/O controller 640 represents hardware devices and software components related to interaction with a user. I/O controller 640 is operable to manage hardware that is part of audio subsystem 620 and/or display subsystem 630. Additionally, I/O controller 640 illustrates a connection point for additional devices that connect to computing device 600 through which a user might interact with the system. For example, devices that can be attached to the computing device 600 might include microphone devices, speaker or stereo systems, video systems or other display devices, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of the computing device 600. Additionally, audio output can be provided instead of, or in addition to display output. In another example, if display subsystem 630 includes a touch screen, the display device also acts as an input device, which can be at least partially managed by I/O controller 640. There can also be additional buttons or switches on the computing device 600 to provide I/O functions managed by I/O controller 640.

In one embodiment, I/O controller 640 manages devices such as accelerometers, cameras, light sensors or other environmental sensors, or other hardware that can be included in the computing device 600. The input can be part of direct user interaction, as well as providing environmental input to the system to influence its operations (such as filtering for noise, adjusting displays for brightness detection, applying a flash for a camera, or other features).

In one embodiment, computing device 600 includes power management circuitry 650 that receives external power, e.g., for operation of the computing device 600, and manages features related to power saving operation. Memory subsystem 660 includes memory devices for storing information in computing device 600. Memory can include nonvolatile (state does not change if power to the memory device is interrupted) and/or volatile (state is indeterminate if power to the memory device is interrupted) memory devices. Memory subsystem 660 can store application data, user data, music, photos, documents, or other data, as well as system data (whether long-term or temporary) related to the execution of the applications and functions of the computing device 600.

Elements of embodiments are also provided as a machine-readable medium (e.g., memory 660) for storing the computer-executable instructions (e.g., instructions to implement any other processes discussed herein). The machine-readable medium (e.g., memory 660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 670 includes hardware devices (e.g., wireless and/or wired connectors and communication hardware) and software components (e.g., drivers, protocol stacks) to enable the computing device 600 to communicate with external devices. The computing device 600 could be separate devices, such as other computing devices, wireless access points or base stations, as well as peripherals such as headsets, printers, or other devices.

Connectivity 670 can include multiple different types of connectivity. To generalize, the computing device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 680 include hardware interfaces and connectors, as well as software components (e.g., drivers, protocol stacks) to make peripheral connections. It will be understood that the computing device 600 could both be a peripheral device ("to" 682) to other computing devices, as well as have peripheral devices ("from" 684) connected to it. The computing device 600 commonly has a "docking" connector to connect to other computing devices for purposes such as managing (e.g., downloading and/or uploading, changing, synchronizing) content on computing device 600. Additionally, a docking connector can allow computing device 600 to connect to certain peripherals that allow the computing device 600 to control content output, for example, to audiovisual or other systems.

In addition to a proprietary docking connector or other proprietary connection hardware, the computing device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 600 (e.g., the power management circuitry 650) receives AC power from the AC power source, e.g., as discussed with respect to FIGS. 1-5. It is assumed that the computing device 600 is one of the devices 260a. In some embodiments, the computing device 600 (e.g., the power management circuitry 650) receives DC power from the BU 204a, when there is an AC power outage and the BU 204a is operational, e.g., as discussed with respect to FIGS. 1-5. In some embodiments, the computing device 600 (e.g., the power management circuitry 650) receives DC power from the power bus 230 (e.g., from the BU 204b, 204N, and/or the like), in case of AC power failure and the BU 204a being non-operational, e.g., as discussed with respect to FIGS. 1-5.

Techniques and architectures for providing reliable power delivery are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
   first, second, and third backup units comprising first, second, and third batteries, respectively, and first, second, and third controllers, respectively;
   a power bus coupled to the first, second, and third backup units; and
   a data bus coupled to the first, second, and third controllers; wherein:
      each backup unit comprises a respective node to connect to a respective power sink, a first switch to connect the respective node to the respective battery, and a second switch to connect the respective node to the power bus;
      the first, second, and third controllers are to control the first and second switches in the first, second, and third backup units, respectively;
      when the first backup unit is operational:
         the first controller is set up as a primary controller and the second and third controllers are set up as secondary controllers;
         the second and third controllers are to broadcast state information on the data bus indicating whether the second and third backup units, respectively, are operational; and
         the first controller is to collect the state information broadcast by the second and third controllers, and to control one or more aspects of the second and third controllers based on the collected state information; and
      when the first backup unit fails:
         the second controller takes over as the primary controller and the third controller remains set up as a secondary controller;
         the third controller is to broadcast additional state information on the data bus indicating whether the third backup unit is operational; and
         the second controller is to collect the additional state information, and to control one or more aspects of the third controller based on the collected additional state information.

2. The apparatus of claim 1, wherein in response to an interruption in an alternating current (AC) power supply to the respective power sinks, when the first backup unit is operational, the first controller is to connect the first battery to its node via its first switch, to provide power to the respective power sink from the first battery.

3. The apparatus of claim 1, wherein in response to an interruption in an alternating current (AC) power supply to the respective power sinks, when the first backup unit is operational, and there is a deficiency of power delivery with the first battery, the first controller is to decouple the first battery from the respective node via its first switch and to connect the respective node to the power bus via its second switch, to provide power to the respective power sink from the power bus.

4. The apparatus of claim 1, further comprising a detector to detect a deficiency of power delivery by an alternating current (AC) power supply to the respective power sinks.

5. The apparatus of claim 1, wherein when the first backup unit is operational, the second and third controllers are to sequentially broadcast state information on the data bus, and a lack of a broadcast of state information from at least one of the second or third controllers indicates the at least one of the second or third controllers is non-operational.

6. The apparatus of claim 1, wherein each of the backup units further comprises a charger to charge the respective battery of the backup unit.

7. The apparatus of claim 1, wherein when the first controller is set as the primary controller, the first controller is to select at least one of the second or third backup units which are operational based on the state information, and in response to an interruption in an alternating current (AC) power supply.

8. The apparatus of claim 1, wherein when the first controller is set as the primary controller, the first controller is to identify at least one of the second or third backup units as being non-operational based on the collected state information.

9. The apparatus of claim 1, wherein the state information broadcast by the second and third controllers is periodically broadcast on the data bus, and a lack of a broadcast of state information from at least one of the second or third controllers indicates the at least one of the second or third controllers, respectively, is non-operational.

10. The apparatus of claim 1, wherein the state information broadcast by the second and third controllers refers to whether the second and third backup units, respectively, are at least one of overloaded or have a low charge level.

11. The apparatus of claim 1, wherein each respective controller broadcasts its state information on the data bus for receipt by others of the respective controllers and the respective controllers of the first, second, and third backup units form a distributed controller.

12. The apparatus of claim 1, wherein when the first backup unit is operational:
   the broadcast of the state information on the data bus by the second and third controllers occurs in a repeated sequence; and
   in each occurrence of the sequence, at specified time intervals, the second controller is to broadcast state information on the data bus indicating the second backup unit is operational after which the third controller is to broadcast state information on the data bus indicating the third backup unit is operational.

13. The apparatus of claim 12, wherein when the first backup unit is operational, a lack of a broadcast of state information from at least one of the second or third backup units at one of the specified time intervals indicates to the first controller that the at least one of the second or third backup units is non-operational.

14. A system, comprising:
   first, second, and third backup units comprising a first battery, a second battery, and a third battery, respectively, the first battery, second battery, and third battery are direct current (DC) power sources for first, second, and third power sinks, respectively; and
   a data bus coupled to the first, second, and third backup units;

wherein:
when the first backup unit is operational:
the first controller is set up as a primary controller and the second and third controllers are set up as secondary controllers;
the second and third controllers—are to communicate state information on the data bus to the primary controller indicating whether the second and third backup units, respectively, are operational; and
the first controller is to collect the state information communicated by the second and third controllers, and to control the second and third controllers based on the collected state information; and
when the first backup unit fails:
the second controller takes over as the primary controller and the third controller remains set up as a secondary controller;
the third controller is to communicate additional state information on the data bus indicating whether the third backup unit is operational; and
the second controller is to collect the additional state information and to control the third controller based on the collected additional state information.

15. The system of claim 14, further comprising
a power bus coupled to the first, second, and third backup units; and
a detector to detect a signal indicative of whether there is a deficiency of power delivery by an alternating current (AC) power supply to the first, second, and third power sinks;
wherein when the detector determines there is not the deficiency of power delivery by the AC power supply, and when the first backup unit is operational, the first controller is to disconnect the first backup unit from the power bus and to control the second and third controllers to disconnect the second and third backup units, respectively, from the power bus.

16. The system of claim 14, further comprising:
a detector to detect a signal indicative of whether there is a deficiency of power delivery by an alternating current (AC) power supply to the first, second, and third power sinks;
wherein when the detector determines there is a deficiency of power delivery by the AC power supply, the first backup unit is operational and the state information of the second and third controllers indicate the second and third backup units are operational, the first controller is to control the second-controller to connect the second backup unit to the second power sink and to control the third controller of the third backup unit to connect the third backup unit to the third power sink.

17. The system of claim 14, further comprising:
a power bus coupled to the first, second, and third backup units; and
a detector to detect a signal indicative of whether there is a deficiency of power delivery by an alternating current (AC) power supply to the first, second, and third power sinks;
wherein when the detector determines there is a deficiency of power delivery by the AC power supply, the first backup unit is operational, the state information of the second controller indicates the second backup unit is non-operational, and the state information of the third controller indicates the third backup unit is operational, the first controller is to control the third controller to connect the third backup unit to the second power sink via the power bus and to connect the third backup unit to the third power sink.

18. One or more non-transitory computer-readable storage media having stored thereon instructions which, when executed by one or more processing units, cause the one or more processing units to perform a method comprising:
setting a first controller of a first backup unit as a primary controller while second and third controllers of second and third backup units, respectively, are set as secondary backup units;
when the first controller is set as the primary controller, receiving state information at the first controller via a data bus, the state information is broadcast by the second and third controllers and indicates whether the second and third backup units, respectively, are operational, wherein the first controller is to control the second and third backup units based on the received state information; and
when the first controller fails, setting the second controller as the primary controller while the third controller remains as a secondary controller, receiving additional state information at the second controller via the data bus, the additional state information is broadcast by the third controller and indicates whether the third backup unit is operational, wherein the second controller is to control the third backup unit based on the received additional state information.

19. The one or more computer-readable storage media of claim 18, wherein the state information broadcast by the second and third controllers indicates whether there is a deficiency of power delivery of batteries of the second and third backup units, respectively.

20. The one or more computer-readable storage media of claim 18, wherein the state information broadcast by the second and third controllers is periodically broadcast on the data bus, and a lack of a broadcast of state information from at least one of the second or third controllers indicates at least one of the second or third backup units, respectively, is non-operational.

* * * * *

UNITED STATES PATENT AND TRADEMARK OFFICE
CERTIFICATE OF CORRECTION

PATENT NO. : 11,456,615 B2
APPLICATION NO. : 16/369845
DATED : September 27, 2022
INVENTOR(S) : Chuan Song, Xiaoguo Liang and Feng Jiang It is certified that error appears in the above-identified patent and that said Letters Patent is hereby corrected as shown below:

In the Claims

Columns 20-21
Lines 67 and 1, Claim 14 "….units; wherein:" should read --….units; wherein:--

Column 21
Line 6, Claim 14 "…controllers—are…" should read --…. controllers are …--
Line 51, Claim 16 "… the second-controller…" should read --…. the second controller…--

Signed and Sealed this
Nineteenth Day of November, 2024

Katherine Kelly Vidal
*Director of the United States Patent and Trademark Office*